United States Patent [19]

Albrecht et al.

[11] Patent Number: 5,896,242

[45] Date of Patent: Apr. 20, 1999

[54] SPINDLE MOTOR WITH STRESS ALLEVIATING GROOVE PROVIDED IN HUB CYLINDRICAL PROTRUSION PORTION

[75] Inventors: David W. Albrecht, San Jose, Calif.; Hiroshi Matsuda, Zama; Keishi Takahashi, Fujisawa, both of Japan

[73] Assignee: International Business Machines Corporation, Armonk, N.Y.

[21] Appl. No.: 08/924,219

[22] Filed: Sep. 5, 1997

[30] Foreign Application Priority Data

Sep. 6, 1996 [JP] Japan .................................. 8-236300

[51] Int. Cl.⁶ ...................... G11B 19/20; G11B 33/14; H02K 5/173; F16C 35/067
[52] U.S. Cl. .................. 360/99.08; 310/67 R; 310/90; 360/97.02
[58] Field of Search ................ 360/98.07, 98.08, 360/99.08, 99.12, 97.02; 310/90, 67 R

[56] References Cited

U.S. PATENT DOCUMENTS

| | | | |
|---|---|---|---|
| 4,717,977 | 1/1988 | Brown | 360/98.08 |
| 5,112,147 | 5/1992 | Imamura et al. | 384/605 |
| 5,138,209 | 8/1992 | Chuta et al. | 310/67 R |
| 5,160,866 | 11/1992 | Hishida et al. | 310/90 |
| 5,214,326 | 5/1993 | Yonei | 360/99.05 |
| 5,227,686 | 7/1993 | Ogawa | 310/90 |
| 5,333,079 | 7/1994 | Takegami et al. | 360/99.08 |
| 5,373,407 | 12/1994 | Stupak, Jr. et al. | 360/99.08 |
| 5,394,283 | 2/1995 | Hans et al. | 360/99.08 |
| 5,430,589 | 7/1995 | Moir et al. | 360/97.02 |
| 5,459,628 | 10/1995 | Brooks | 360/99.08 |
| 5,463,515 | 10/1995 | Koiyama | 360/98.01 |

FOREIGN PATENT DOCUMENTS

| | | |
|---|---|---|
| 1-290164 | 11/1989 | Japan . |
| 2-240889 | 9/1990 | Japan . |
| 4-255964 | 9/1992 | Japan . |
| 4-289749 | 10/1992 | Japan . |
| 4-360077 | 12/1992 | Japan . |

*Primary Examiner*—Craig A. Renner
*Attorney, Agent, or Firm*—Monica D. Lee; Robert B. Martin

[57] ABSTRACT

A spindle motor assembly includes a hub, a motor, and a bearing cartridge having a plurality of bearing balls disposed between a sleeve and a shaft. The shaft includes a cylindrical hollow portion which is attached to a cylindrical protrusion portion of the hub to provide a stable attachment between the hub and shaft without increasing the height of the spindle motor assembly. Grooves are formed on the outer peripheral surface of the cylindrical protrusion portion to alleviate stress between the hub and shaft resulting from thermal expansion.

1 Claim, 2 Drawing Sheets

SPINDLE MOTOR WITH STRESS ALLEVIATING GROOVE PROVIDED IN HUB CYLINDRICAL PROTRUSION PORTION

BACKGROUND OF THE INVENTION

1. Field of the Invention

The present invention generally relates to a magnetic storage system, and more particularly to a spindle motor assembly.

2. Description of Prior Art

Magnetic storage systems such as hard disk drives, are information storage devices that store data on at least one rotatable magnetic disk. In conventional hard disk drives, a spindle motor is used to drive the rotation of the disk(s). The high-speed rotation (for example, 5400 rpm) of the disk(s) is achieved by fixing a hub, which integrally holds the disk(s), to the spindle motor and by transmitting rotation of the spindle motor to the hub. Information is written on or read from a disk by a head or magnetic transducer which is typically maintained at a predetermined distance above the surface of the disk (also referred to as "fly height"). The head is positioned over a desired track to read from or write to the desired track. If rotation of the disk is not accurately executed, then it becomes difficult for the head to follow the track, often leading to erroneous data when data is written to or read from the disk. Accordingly, the ability of a hard disk drive to maintain regular high-speed rotation without rotational distortion of the disk surface improves the overall performance of the hard disk drive.

As the demand for hard disk drives having larger storage capacity with reduced height dimensions increases, it becomes necessary to design a spindle motor with improved shock resistance. Hard disk drives typically mount the disk(s) on a hub which is mounted on the rotating member of the spindle motor. The manner in which the hub is mounted to the spindle motor may improve the shock resistance of the spindle motor. The mounting of the hub onto the spindle motor may be simplified by providing a bearing cartridge. A bearing cartridge typically refers to an assembly that includes a shaft, bearing balls, and a sleeve integrated and housed within a single cartridge.

A conventional bearing cartridge 20 is shown in FIG. 1. The bearing cartridge 20 includes a shaft 13, a sleeve 11, a plurality of bearing balls 12, and a retainer 10 for holding the bearing balls 12 on the circumference thereof at regular intervals. Grooves formed on the outer peripheral surface of shaft 13 and the inner peripheral surface of sleeve 11 determine the fixed positions of the bearing balls 12. The bearing balls 12 are retained in the grooves.

Referring now to FIG. 2, bearing cartridge 20 is assembled together with a hub 14 and a motor which includes a stator 17 and a magnet 15 to form a conventional spindle motor assembly. The magnet 15 is fixed to the hub 14. Shaft 13 includes a hub mounting portion 21 formed in the upper portion of shaft 13 to which hub 14 is attached. A flange 16 is attached to stator 17 which is positioned between sleeve 11 and magnet 15. By attaching hub 14 with shaft 13 in this manner, hub 14 is capable of rotating. The central hole of disk(s) can be inserted onto the outer periphery of the hub 14, such that the disk(s) may be attached to hub 14 by axially loading the disk stack with a disk clamping device such as a belleville spring type clamp with a fastener into shaft 13.

Bearing cartridges, such as bearing cartridge 20 shown in FIG. 1, are often used to simplify the hub mounting operation. Unfortunately, when conventional bearing cartridge 20 is mounted on hub mounting portion 21 located at the upper portion of shaft 13, the hard disk drive requires an increased height dimension. The increased height dimension is caused by the additional height added by hub mounting portion 21. Unfortunately, a reduction in height of hub mounting portion 21 to decrease the overall height of the hard disk drive often leads to an unstable attachment between shaft 13 and hub 14 which adversely affects the stable rotation of the disk(s).

Because a predetermined height is required to achieve a stable attachment between hub 14 and shaft 13, one approach is to narrow the pitch between the upper and lower bearing balls 12 within bearing cartridge 20. However, when the pitch between bearing balls 12 is narrowed in this manner, the shock resistance capability of the hard disk drive to external disturbances such as shock is reduced, thereby decreasing the likelihood that stable rotation of the disk will be achieved.

SUMMARY OF THE INVENTION

It is an object of the present invention to provide an apparatus and method for mounting a hub on a shaft of a spindle motor assembly to provide a stable attachment between the shaft and the hub while reducing the height dimension of the spindle motor assembly. It is a further object of the present invention to alleviate stress between the hub and shaft of a spindle motor assembly resulting from thermal expansion.

A spindle motor assembly is described. The spindle motor assembly includes a bearing cartridge and a hub. The bearing cartridge is formed by at least two bearing balls disposed between a shaft and a sleeve. The shaft includes a cylindrical hollow portion. The hub includes a cylindrical protrusion portion positioned within and attached to the cylindrical hollow portion of the shaft. The mounting structure formed between the cylindrical hollow portion of the shaft and the cylindrical protrusion portion of the hub allows the shaft and the hub to integrally rotate with respect to the sleeve.

Also described is a method of manufacturing the spindle motor assembly. The method includes forming a cylindrical hollow portion in the shaft and forming a cylindrical protrusion portion in the hub. The cylindrical protrusion portion of the hub is inserted within and attached to the cylindrical hollow portion of the shaft. This hub mounting structure allows the hub and the shaft to integrally rotate together.

Other objects, features, and advantages of the present invention will be apparent from the accompanying drawings and from the detailed description below.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

Figure 1:
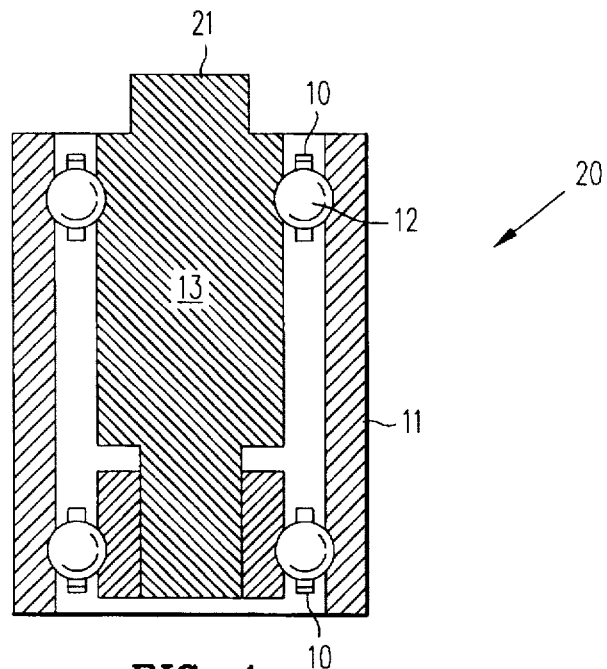
FIG. 1 is a cross-sectional view of a conventional bearing cartridge.
Figure 2:
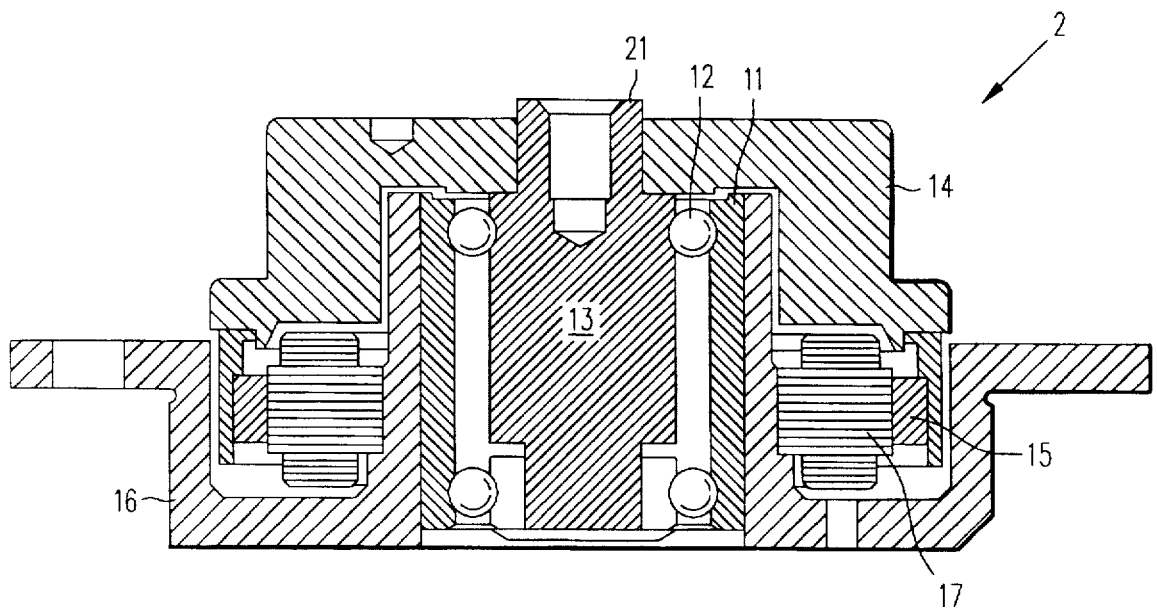
FIG. 2 is a cross-sectional view of a spindle motor assembly incorporating the conventional bearing cartridge shown in FIG. 1.
Figure 3:
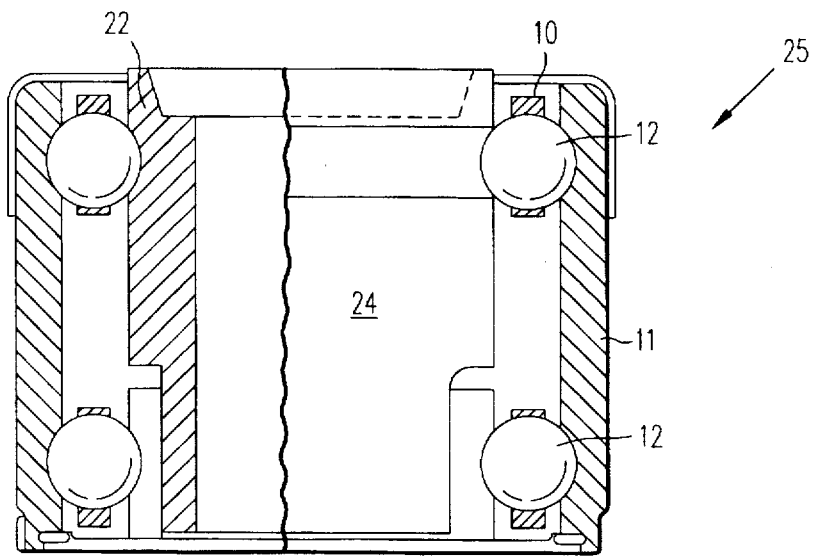
FIG. 3 is a cross-sectional view of a bearing cartridge of one embodiment of the present invention.

FIG. 3 illustrates a partially cut-away, cross-sectional view of a bearing cartridge 25 according to one embodiment of the present invention. Bearing cartridge 25 includes a shaft 22, a sleeve 11, a plurality of bearing balls 12, and a retainer 10 for holding the bearing balls 12 on the circumference thereof at regular intervals. Grooves formed on the outer peripheral surface of shaft 22 and the inner peripheral surface of sleeve 11 determine the fixed positions of bearing balls 12. The bearing balls 12 are retained in the grooves. The upper portion of shaft 22 includes a cylindrical hollow portion 24 for attaching with a hub 52.

Figure 4:
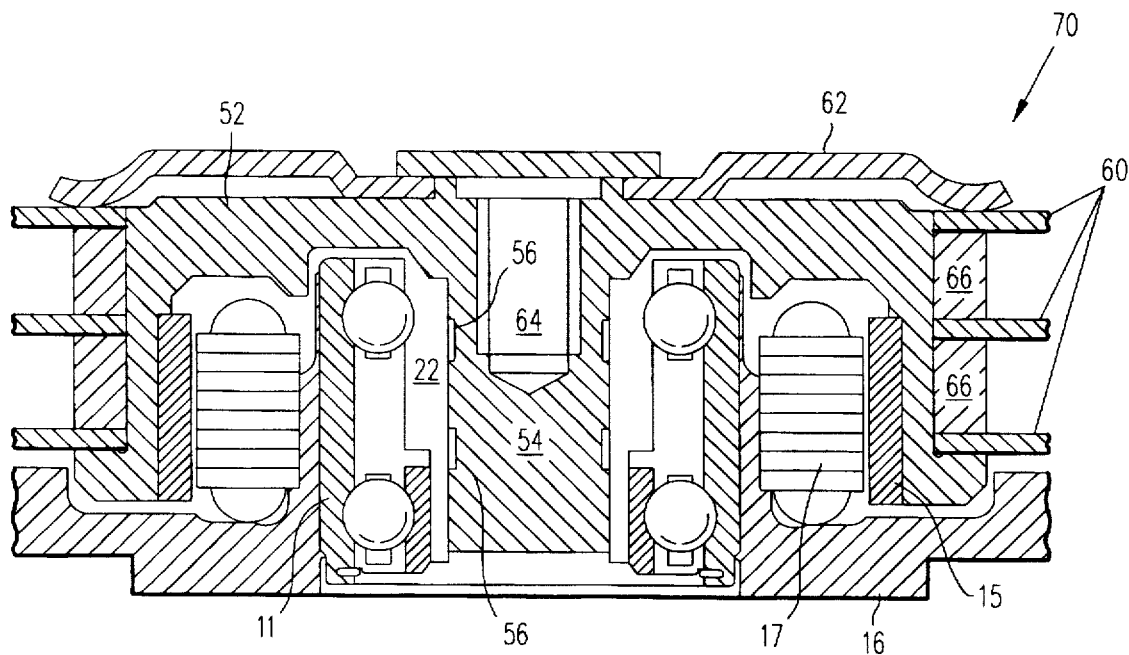
FIG. 4 is a cross-sectional view of a spindle motor assembly incorporating the bearing cartridge shown in FIG. 3.

FIG. 4 shows a cross-sectional view of a spindle motor assembly 70 which includes bearing cartridge 25, hub 52, and a motor. The motor includes a stator 17 and a magnet 15. Hub 52 includes cylindrical protrusion portion 54 which is inserted into cylindrical hollow portion 24 formed at the center of shaft 22 when assembling the spindle motor assembly. Thus, hub 52 is fixed with respect to shaft 22. The cylindrical protrusion portion 54 of hub 52 and cylindrical hollow portion 24 of shaft 22 may be attached by shrink fitting or by an adhesive to prevent shifting or movement between hub 52 and shaft 22. Additionally, hub 52 includes a central portion (also referred to as a screw hole) in which a screw 64 is inserted to a secure a disk clamping device 62. Disks 60 are separated by spacers 66 and secured to the outer periphery of hub 52 by disk clamp device 62.

The sleeve 11, forms the outer peripheral portion of the bearing cartridge 25, and is attached to a flange 16. The flange 16 has a stator 17 fixed thereto. The hub 52 has a magnet 15 fixed to thereto. The disks 60, hub 52 having the disks 60 fixed thereto, and shaft 22 are rotated as a whole.

When hub 52 and bearing cartridge 25 are manufactured from the same material, for example, stainless steel, distortion at in the interface of hub 52 and bearing cartridge 25 typically does not occur during the normal operating temperature of the hard disk drive. This type of distortion may be caused by differences in the coefficients of thermal expansion between the materials used to manufacture hub 52 and bearing cartridge 25. In this case, the coefficient of thermal expansion between hub 52 and bearing cartridge 25 are the same and therefore distortion is not likely to occur. However, in the case where an aluminum hub is used for a reduction in the weight such that hub 52 and shaft 22 of bearing cartridge 25 are made from materials having different coefficients of thermal expansion (for example, a 430 series stainless steel hub 52 and a high chrome bearing steel shaft 22), distortion is likely to occur.

Grooves 56 formed on the outer peripheral surface of cylindrical protrusion portion 54 of hub 52 may be used to alleviate stresses produced at the interface between cylindrical protrusion portion 54 of hub 52 and cylindrical hollow portion 24 of shaft 22 resulting from temperature changes. Shafts made of bearing steel typically have a coefficient of linear expansion of $\alpha=17\times10^{-6}$ per °C. and aluminum hubs typically have a coefficient of linear expansion of $\alpha=23\times10^{-6}$ per °C. The diameter of cylindrical protrusion portion 54 at grooves 56 is smaller that the diameter elsewhere on the cylindrical protrusion portion 54. If the diameter of cylindrical protrusion portion 54 of the hub 52 is made uniform over the entire length of cylindrical protrusion portion 54 that interfaces with shaft 22, the difference in the coefficient of thermal expansion between hub 52 and shaft 22 caused by temperature changes produces stress at the interface between cylindrical protrusion portion 54 and shaft 22. Such stress may lead to rotational distortion of the disk.

In addition to alleviating this type of stress, grooves 56 can also be used to collect the residual adhesive material used for joining cylindrical protrusion portion 54 and shaft 22 together.

Referring to FIG. 4, a plurality of grooves 56 are formed on the outer peripheral surface of cylindrical protrusion portion 54 of hub 52. Grooves 56 are designed to distribute the stress resulting from the differences in the coefficient of thermal expansion between hub 52 and shaft 22.

For one embodiment, grooves 56 on the outer peripheral surface of cylindrical protrusion portion 54 of hub 52 substantially reduces or prevents the rotational distortion within the range of about 5 through 60° C. leading to a more stable rotation of disks 60. When determining the diameter of cylindrical protrusion portion 54 of hub 52, the difference in diameter between the small-diameter portion that forms grooves 56 and the remaining portion (also referred to as the large-diameter portion) must take into consideration the coefficient of linear expansion of each material over the range of operating temperature of spindle motor assembly 70. For example, assume the following conditions.

Hub: aluminum, $\alpha H=23\times10^{-6}$ per °C.

Shaft: stainless steel, $\alpha S=17\times10^{-6}$ per °C.

Inner shaft diameter: 3.5 mm

Operating temperature range: 5 to 55° C.

For the operating temperature specified above, the expansion of the outer diameter of cylindrical protrusion portion 54 of hub 52 (also referred to as hub diameter expansion)and the expansion of the inner diameter of shaft 22 (also referred to as inner shaft diameter expansion) may be calculated as follows:

Hub diameter expansion: $3.5\times(23\times10^{-6})\times50=4.02$ (μm)

Inner shaft diameter expansion: $3.5\times(17\times10^{-6})\times50=2.98$ (μm)

In order for cylindrical protrusion portion 54 of hub 52 and shaft 22 to remain attached or joined in the aforementioned operating temperature range, the large-diameter portion of cylindrical protrusion portion 54 of the hub 52 is required to be greater than 3.5 mm–1.04 μm in order to remain attached. Likewise, the small-diameter portion of cylindrical protrusion portion 54 of hub 52 is required to be less than 3.5 mm–1.04 μm in order to maintain its loose state. The value 1.04 μm represents the difference between the hub diameter expansion value of 4.02 μm and the inner shaft diameter expansion value of 2.98 μm.

For this example, the difference in diameter between the small-diameter portion and the large-diameter portion in the hub is 1.04+1.04=2.08 μm. Accordingly the depth of grooves 56 is at least 2.08. To determine the difference in diameter between the small-diameter portion and the large-diameter portion (i.e., the depth of grooves 56) of cylindrical protrusion portion 54 of hub 52, the following equation may be used to calculate the maximum difference X:

$$X=2\times(\alpha H-\alpha S)\times L\times T$$

where T represents the motor operating temperature range, L represents the inner shaft diameter, $\alpha H$ represents the linear expansion coefficient of the hub, and $\alpha S$ represents the linear expansion coefficient of shaft 22. In addition to this equation, other factors may need to be taken into consideration such as the accuracy of the spindle motor assembly in operation.

According to the embodiments described above, the mounting structure between the hub on which a disk is mounted and the shaft of the bearing cartridge is reduced in size and made stable. In addition, there is provided a spindle motor assembly where an occurrence of distortion is minimized with respect to temperature change and stability is enhanced. Accordingly, the reliability of the spindle motor assembly is enhanced.

In the foregoing description, the invention has been described with reference to specific exemplary embodiments thereof. It will, however, be evident that various modifications and changes may be made thereto without departing from the broader spirit or scope of the present invention as defined in the appended claims. The specification and drawings are, accordingly, to be regarded in an illustrative rather than a restrictive sense.

What is claimed is:

1. A spindle motor assembly, comprising:

a bearing cartridge having a sleeve, a shaft with a cylindrical hollow portion, and at least two bearing balls positioned between said shaft and said sleeve; and a hub having a cylindrical protrusion portion, said cylindrical protrusion portion positioned within and attached to said cylindrical hollow portion of said shaft such that said shaft and said hub are operable to integrally rotate with respect to said sleeve, the cylindrical protrusion portion of said hub includes an outer peripheral surface having at least one groove positioned to alleviate stress resulting from thermal expansion of said hub and said shaft wherein, the depth of the groove is by X and, $X=2\times(\alpha H-\alpha S)\times L\times T$, where T is an operating temperature range of said spindle motor assembly, L is an inner diameter of said shaft, $\alpha H$ is a coefficient of linear expansion of said hub, and $\alpha S$ is a coefficient of linear expansion of said shaft.

* * * * *